(12) United States Patent
Shinkai et al.

(10) Patent No.: US 7,708,812 B2
(45) Date of Patent: May 4, 2010

(54) HYDROGEN GAS SEPARATOR FIXING STRUCTURE AND HYDROGEN GAS SEPARATING DEVICE USING THE SAME

(75) Inventors: Masayuki Shinkai, Ama-Gun (JP); Osamu Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 542 days.

(21) Appl. No.: 11/677,689

(22) Filed: Feb. 22, 2007

(65) Prior Publication Data

US 2007/0209513 A1 Sep. 13, 2007

(30) Foreign Application Priority Data

Mar. 13, 2006 (JP) .............................. 2006-067389

(51) Int. Cl.
*B01D 53/22* (2006.01)

(52) U.S. Cl. .................. 96/10; 96/4; 96/11; 95/45; 95/55; 95/56; 55/524; 55/DIG. 5; 210/500.25

(58) Field of Classification Search ...................... 96/4, 96/8, 10, 11; 95/45, 55, 56; 55/524, DIG. 5; 210/500.25
See application file for complete search history.

(56) References Cited

U.S. PATENT DOCUMENTS 5,904,754 A * 5/1999 Juda et al. ...................... 96/11

| | | | |
|---|---|---|---|
| 6,066,592 A * | 5/2000 | Kawae et al. | 95/56 |
| 6,946,020 B2 * | 9/2005 | Han et al. | 95/56 |
| 6,958,087 B2 | 10/2005 | Suzuki | |
| 2001/0013272 A1 * | 8/2001 | Blase et al. | 96/8 |
| 2004/0187690 A1 * | 9/2004 | Suzuki | 96/10 |

FOREIGN PATENT DOCUMENTS

| JP | 62-273030 | 11/1987 |
|---|---|---|
| JP | 63-171617 | 7/1988 |
| JP | 07-265673 | 10/1995 |
| JP | 2003-126662 | 5/2003 |

\* cited by examiner

*Primary Examiner*—Jason M Greene
(74) *Attorney, Agent, or Firm*—Burr & Brown

(57) ABSTRACT

A hydrogen gas separator fixing structure includes a gas separator having a support and a membrane provided on at least one surface of the support, which membrane contains a first metal capable of separating hydrogen gas from a hydrogen-containing gas, a metal flange connected to at least one open end of the gas separator, a bonding layer containing a second metal, provided at the portion at which the gas separator and the metal flange are connected to each other and on the surface of the gas separation membrane side of the portion, a packing provided on the bonding layer, and a ring-shaped metal member capable of fixing the packing by pressing, provided so that at least part thereof is in contact with the bonding layer, wherein the bonding layer is provided by a heat treatment conducted at a temperature lower than the melting point of the second metal.

7 Claims, 2 Drawing Sheets

HYDROGEN GAS SEPARATOR FIXING STRUCTURE AND HYDROGEN GAS SEPARATING DEVICE USING THE SAME

BACKGROUND OF THE INVENTION AND RELATED ART STATEMENT

The present invention relates to a hydrogen gas separator fixing structure and a hydrogen gas separating device using the same.

Hydrogen gas is used in a large amount as a basic raw material gas in petrochemical industry and also is expected highly as a clean energy source. In order to separate only a particular gas component from a mixed gas of multiple components, there has been known a separation method using an organic or inorganic, gas separation membrane, i.e. a membrane separation method. As the membrane used for hydrogen separation, there are known an organic polymer membrane such as polyimide, polysulfone or the like, a ceramic membrane such as silica or the like, and an inorganic compound membrane such as palladium, palladium alloy or the like. A palladium membrane or a palladium alloy membrane, in particular, is heat-resistant and further makes it possible to obtain hydrogen of extremely high purity.

Palladium or palladium alloy can absorb hydrogen alone, making possible selective separation of hydrogen. Palladium or palladium alloy is ordinarily used in the form of a thin membrane of about 1 to 20 μm in thickness, coated on a porous support of ceramic or the like, in order to achieve a high hydrogen permeation rate.

As to related conventional techniques, there are disclosed gas separators comprising a porous substrate and a gas separation membrane composed of palladium or palladium alloy, formed on one surface of the porous substrate (see, for example, Patent Documents 1 and 2). The porous substrate used therein is composed of glass, or a ceramic of aluminum oxide or the like. The gas separation membrane is formed on the porous substrate because no sufficient mechanical strength is obtained only with the gas separation membrane.

A gas separating device incorporating therein a gas separator such as mentioned above has such a structure that a gas separator is placed in a metal-made vessel, wherein a gas to be separated is introduced from one side of the gas separator, only a particular gas (hydrogen) permeates the gas separator, and purified gas (hydrogen) is taken out from the other side of the gas separator. Therefore, it is necessary that the gas to be treated side and the purified gas side are separated gas-tightly and the gas separator is gas-tightly connected to the purified gas outlet of metal-made vessel. Hence, it is important that the gas to be separated causes no leakage from the connection portion between the gas separator and the metal flange connecting to the purified gas outlet, to the purified gas side. Meanwhile, in order to efficiently separate hydrogen gas using the gas separator, the permeation rate of hydrogen atoms in gas separation membrane needs to be high; therefore, separation at a high temperature (300° or higher, preferably 500° or higher) and a high pressure (5 to 20 atm.) is advantageous. In this case, the gas tightness and durability of the connection part between the gas separator and the metal flange are important. That is, there is required such durability as to be able to sufficiently maintain the gas tightness under which the gas to be separated causes no leakage from the connection part between the gas separator and the metal flange to the purified gas side even under conditions of high temperature and high pressure.

In order to inhibit leakage of gas under the above conditions, it is generally conducted to braze the gas separator and the metal flange with a brazing material or the like (see, for example, Patent Document 3). It is also conducted to use an O-ring to secure the gas tightness between the gas separator and the metal flange therefor when the gas-treating temperature is 250° C. or lower.

In the above-mentioned brazing of the gas separator and the metal flange, however, there occur in some cases problems that the high temperature of brazing and resultant thermal stress causes the breakage of the porous substrate constituting the gas separator, or the load of heat cycle invites a reduction in gas tightness between the gas separator and the metal flange. Further, it is necessary to control the clearance between the gas separator and the metal flange therefor strictly and connect them in such a controlled state. Furthermore, the high brazing temperature incur in some cases, problems such as the breakage due to melting and the strain generation due to heat stress, of the gas separation membrane constituting the gas separator. In using the O-ring, it has been substantially difficult to maintain sufficient gas tightness when the temperature of gas treatment is higher than 250° C., and the there has been a limitation in applicable temperature range.

In order to solve the above-mentioned problems, there are disclosed a gas separator fixing structure wherein a gas separator and a metal flange are sealed with a gland packing (see, for example, Patent Document 4). Since this gas separator fixing structure employs no brazing, there hardly occurs a problem of breakage of substrate due to thermal stress; however, gas-tight brazing completely free from leakage is difficult to achieve and a countermeasure for leakage from connection portion is necessary. In applications where separation of higher-purity gas is required, there has been necessary even higher gas tightness between gas separator and metal flange therefor.

Patent Document 1: JP-A-1987-273030
Patent Document 2: JP-A-1988-171617
Patent Document 3: JP No. 3305484
Patent Document 4: JP-A-2003-126662

SUMMARY OF THE INVENTION

The present invention has been made in view of the above-mentioned problems of the prior art and aims at providing (1) a hydrogen gas separator fixing structure which hardly gives rise to the thermal stress-induced breakage of the substrate constituting the gas separator and the reduction in gas tightness between the gas separator and the metal flange therefor, caused by the load of heat cycle and which can be used even at high temperatures, and (2) a hydrogen gas separating device using such a hydrogen gas separator fixing structure.

The present inventors made a study in order to achieve the above aim. As a result, it was found that the above aim can be achieved by, in a hydrogen gas separator fixing structure where a hydrogen gas separator comprising a porous substrate and a gas separation membrane formed thereon is fixed by a metal flange, providing a bonding layer of given thickness at the portion at which the gas separator and the metal flange are connected to each other and on the surface of the gas separation membrane side of said portion and further providing a packing on the bonding layer so as to be able to press the bonding layer. The finding has led to the completion of the present invention.

According to the present invention there are provided a hydrogen gas separator fixing structure and a hydrogen gas separating device, both described below.

[1] A hydrogen gas separator fixing structure comprising:
a gas separator comprising a tubular support and a gas separation membrane provided on at least one surface of the tubular support, which membrane contains a first metal capable of separating hydrogen gas from a hydrogen-containing gas,
a metal flange connected to at least one open end of the gas separator,
a bonding layer of 20 to 400 μm in thickness containing a second metal, provided at the portion at which the gas separator and the metal flange are connected to each other and on the surface of the gas separation membrane side of said portion,
a packing provided on the bonding layer, and
a metal member capable of fixing the packing by pressing, provided so that at least part thereof is in contact with the bonding layer,
wherein the bonding layer is provided on said surface of the gas separation membrane side of said portion by a heat treatment conducted at a temperature lower than the melting point of the second metal.
[2] A hydrogen gas separator fixing structure according to [1], wherein the first metal is composed mainly of palladium, palladium alloy, palladium and silver, or copper.
[3] A hydrogen gas separator fixing structure according to [1] or [2], wherein the second metal is at least one member selected from the group consisting of gold, silver, platinum, palladium, nickel and copper.
[4] A hydrogen gas separator fixing structure according to any of [1] to [3], wherein the tubular support is composed of a porous ceramic, a metal, carbon or a mixture thereof.
[5] A hydrogen gas separator fixing structure according to any of [1] to [4], wherein the metal flange is composed of stainless steel, INCONEL (family of austenitic nickel-chromium-based superalloys), KOVAR (nickel-cobalt ferrous alloy) or a nickel alloy.
[6] A hydrogen gas separator fixing structure according to any of [1] to [5], wherein the bonding layer is provided on said surface of the gas separation membrane side of said portion by a heat treatment conducted at a temperature lower by at least 50° C. than the melting point of the second metal.
[7] A hydrogen gas separating device comprising:
a pressure vessel, and
a hydrogen gas separator fixing structure set forth in any of [1] to [6], fixed at the inner surface of the pressure vessel.

The hydrogen gas separator fixing structure of the present invention hardly gives rise to the thermal stress-induced breakage of the support constituting the gas separator and the reduction in gas tightness between the gas separator and the metal flange therefor, caused by the load of heat cycle and can be used even at high temperatures.

The hydrogen gas separating device of the present invention hardly gives rise to the thermal stress-induced breakage of the support constituting the gas separator and the reduction in gas tightness between the gas separator and the metal flange therefor, caused by the load of heat cycle and can be used even at high temperatures.

BRIEF DESCRIPTION OF THE DRAWINGS

In FIGS. 1 and 2, 1 is an ring-shaped metal member; 2 and 12 are each an ring-shaped packing presser; 3 and 13 are each an ring-shaped stopper; 4 is an ring-shaped metal flange; 5 is a bonding layer; 6 is a packing; 7 and 17 are each a gas separator; 8 and 18 are each a gas separation membrane; 9 is a tubular support; 11 is a cap-like metal member, 14 is a cap-like metal flange; 15 is a stuffing box; 16 is a thread groove; 19 is a bottomed tubular support; 21 is a through hole; 30 and 40 are each a hydrogen gas separator fixing structure.

DETAILED DESCRIPTION OF THE INVENTION

The preferred embodiments for carrying out the present invention are described below. However, the present invention is not restricted to the following embodiments and it should be construed that there are also included, in the present invention, those embodiments in which appropriate changes, improvements, etc. have been made to the following embodiments based on the ordinary knowledge possessed by those skilled in the art, as long as there is no deviation from the gist of the present invention.

Figure 1:
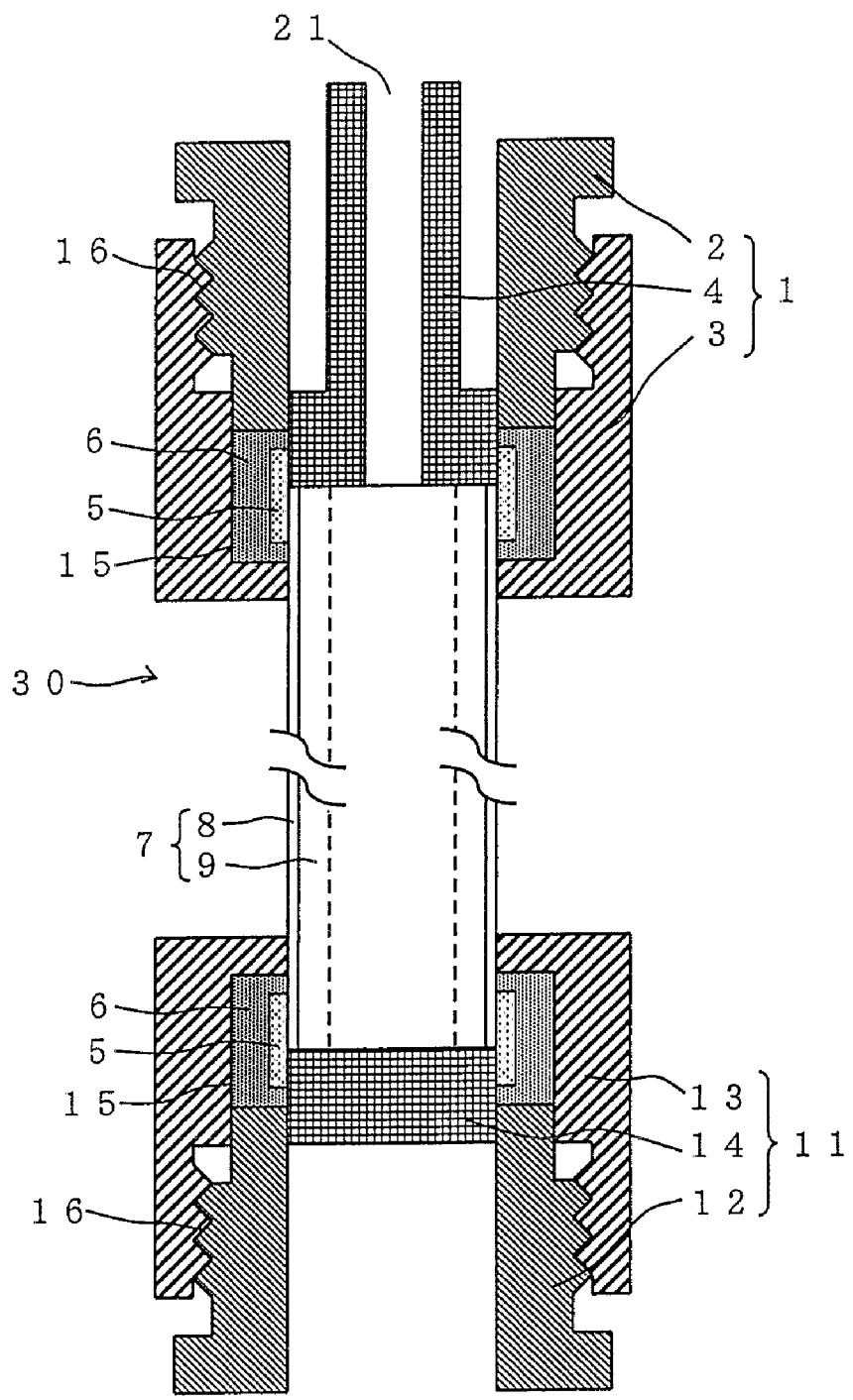
FIG. 1 is a sectional view schematically showing an embodiment of the hydrogen gas separator fixing structure of the present invention.

FIG. 1 is a sectional view schematically showing an embodiment of the hydrogen gas separator fixing structure of the present invention. As shown in FIG. 1, the hydrogen gas separator fixing structure 30 of the present embodiment has a gas separator 7, a bonding layer 5 provided at least at one open end (the upper part in FIG. 1) of the gas separator 7, a packing 6, and a ring-shaped metal member 1 including a metal flange 4.

The gas separator 7 comprises a tubular support 9 and a gas separation membrane 8. The tubular support 9 supports the gas separation membrane which is per se low in mechanical strength and difficult to support itself. The tubular support 9 is constituted by a material which does not hinder gas permeation, such as porous ceramic, metal, carbon or mixture thereof. When the tubular support 9 is made of a porous ceramic, the average pore diameter at its surface on which the gas separation membrane is formed, is preferably 0.01 to 1 μm, more preferably 0.05 to 0.3 μm. With an average pore diameter of less than 0.01 μm, there are a case when the resistance to gas permeation becomes larger and a case when the adhesivity to gas separation membrane becomes lower. Meanwhile, with an average pore diameter of exceeds 1 μm, pin holes are formed easily in the gas separation membrane 8 and a larger thickness is required for the gas separation membrane 8 in order to fill the pores of the tubular support.

The porous ceramic is preferably alumina or zirconia. Alumina or zirconia is preferred because the gas to be separated hardly reacts with them. The porous tubular support made of alumina can be easily produced into an intended shape. Meanwhile, zirconia is preferred because it has a small difference in thermal expansion coefficient over the metal members used as the gas separation membrane. An alumina-made tubular support can be produced by, for example, a method described in JP-A-1987-273030. However, the shape of the tubular support is not limited to a columnar shape, and, for example, it may be of a square pillar, and may be of a column or square pillar which is curved along its axis. Moreover, shape of the through holes is not limited to linear shape, and may be of a curve. A circular-cylindrical, tubular support, whose one end is closed in a bag shape, is advantageous because the number of connection portions (between tubular support and flange) is less. Also, there may be used a tubular support which has a plurality of parallel flow paths.

The gas separation membrane 8 is provided in a film shape on at least one surface of the tubular support 9. The gas separating-membrane 8 may be formed outside (as shown in FIG. 1), inside or, inside and outside the tubular support 9. Part of the gas separation membrane 8 may be present even inside part of the pores of the porous support. Formation by coating, of the gas separation membrane 8 on the surface of the tubular support 9 may be conducted by a known method. There can be used, for example, a chemical plating method, a vacuum evaporation method, a CVD method or a sputtering method, etc.

The gas separation membrane 8 contains a first metal allowing for gas separation. As a specific example of the gas separation membrane 8, there can be mentioned a hydrogen-separation membrane allowing for selective hydrogen permeation. The first metal contained in the gas separation membrane 8 may be a metal allowing for selective hydrogen permeation, and there are preferred palladium (Pd), palladium alloy, and a metal composed mainly of palladium (Pd) and silver (Ag) or copper (Cu) because they show each a high hydrogen permeation rate. Palladium alloy is preferred to contain a metal other than palladium in an amount of 10 to 50 mass % of the total, as described in known literatures such as Journal of Membrane Science, 56 (1991) 315-325: "Hydrogen Permeable Palladium-Silver Alloy Membrane Supported on Porous Ceramics" and JP-A-1988-295402. The main object to make palladium alloyed is to protect palladium against hydrogen embrittlement and to improve separation efficiency at high temperatures. Furthermore, for protection of palladium against hydrogen embrittlement, it is preferred that silver or copper is contained as a metal other than palladium.

The bonding layer 5 is provided at the portion at which the gas separator 7 and the metal flange are connected to each other at the open end of the gas separator 7 and on the surface of the gas separation membrane 8 side of the portion. This bonding layer 5 contains a second metal. The bonding layer 5 is provided on the surface of the gas separation membrane 8 side of the portion by a heat treatment conducted at a temperature lower than the melting point of the second metal. As a result, the second metal contained in the bonding layer 5 gives rise to mutual diffusion with the first metal contained in the gas separation membrane 8 and the metal constituting at least part (the ring-shaped metal flange 4 and the cap-like metal flange 14) of the metal members, and is bonded to them. Thereby, high gas tightness is secured between the gas separator 7 and the metal flanges (the ring-shaped metal flange 4 and the cap-like metal flange 14) connected thereto. Further, between the gas separator 7 and the metal flanges (the ring-shaped metal flange 4 and the cap-like metal flange 14), mechanical strength is maintained by the help of the packing 6 and the metal members (the annual metal member and the cap-like metal member 11), and durability to the stress caused by vibration, assembling, etc. is secured.

As mentioned above, the bonding layer 5 is formed by a heat treatment conducted at a temperature lower than the melting point of the second metal contained therein. Thus, unlike conventional brazing materials used heretofore, the bonding layer 5 is not heated to a molten state for mutual bonding between members; therefore, the mutual diffusion between the component of the bonding layer 5 and the component of the gas separation membrane 8 is suppressed and the hardening or defect generation caused by alloying can be prevented. Further, since the heat treatment temperature is low (lower than the melting point of the second metal contained in the bonding layer 5) and the hardening is suppressed, the thermal stress generated is small and there hardly occur the breakage of the gas separator 7 and the reduction in gas tightness, caused by the load of heat cycle. Incidentally, the bonding layer 5 is provided on the surface of the gas separation membrane side by a heat treatment conducted at a temperature lower than the melting point of the second metal preferably by 50° C. or more, more preferably by 150° C. or more. By being heat-treated at a temperature lower than the melting point of the second metal by 50° C. or more, the bonding layer can give higher gas tightness. Incidentally, the lower limit of the heat treatment temperature is not restricted particularly; however, a heat treatment conducted at a temperature of ½ of the melting point of the second metal or at a temperature lower than that tends to make insufficient the mutual diffusion of metals, which may make it difficult to secure sufficient gas tightness.

The thickness of the bonding layer 5 is 20 to 400 µm, preferably 50 to 300 µm, more preferably 100 to 200 µm. With a thickness of bonding layer 5, of less than 20 µm, the strength of the metal foil or the like used in forming the bonding layer is insufficient, making the handling difficult, and the bonding strength obtained is insufficient, making it difficult to secure sufficient gas tightness. Meanwhile, with a thickness of bonding layer 5, of exceeds 400 µm, the difference in thermal expansion coefficient between the bonding layer 5 and the gas separator 7 or the tubular support 6 is too large, which tends to cause the breakage of the gas separator.

As specific examples of the second metal contained in the bonding layer 5, there can be mentioned gold (Au), silver (Ag), platinum (Pt), palladium (Pd), copper (Cu) and nickel (Ni). A combination of two or more members selected from them can also be used. Of them, silver (Ag) or silver (Ag) alloy is preferred. As silver (Ag) alloy, there can be mentioned Bag-8, etc.

The bonding layer 5 is formed as follows. First, a metal flange (an ring-shaped metal flange 4) is connected to the open end of a gas separator 7; in this state, a metal foil containing a second metal is provided, in a given thickness, on the surface of the gas separation membrane 8 (of gas separator) side of the connection portion at which the gas separator 7 and the metal flange (the ring-shaped metal flange 4) have been connected to each other. Then, a packing 6 and a metal member 1 are provided so as to wrap the metal foil, and a heat treatment is applied at a given temperature in a state that an appropriate tightening pressure has been added to the metal foil via the packing 6.

The packing 6 is provided on the bonding layer 5. The packing 6 may have a sealing function but, in the present invention, need not have a sealing function as long as it allows the bonding layer 5 to have tight contact with the surfaces of the gas separator 7 and the metal flange (the ring-shaped metal flange 4) for easier mutual diffusion of metals and also imparts mechanical strength to the connection portion. The packing 6 may be provided so that it is accommodated inside a stuffing box 15. The stuffing box 15 can accommodate at least one packing 6 and can effectively transmit the tightening pressure imparted to the packing 6 accommodated therein, to the direction of the gas separator 7. Preferably, the packing 6 is provided in a state that it wraps the bonding layer 5 and is in contact therewith.

The packing is not particularly restricted with respect to the material as long as it functions sufficiently at its use temperature. However, in order for the packing to have sufficient durability in high-temperature use, use of a gland packing is desired. The highest use temperature when the gland packing is employed, is preferably at least 300° C., more preferably at least 350° C., particularly preferably at least 450° C. When the highest use temperature of the gland packing is lower than 300° C., there is a case that the packing is unsuitable for use under the high-temperature condition ordinarily considered and is unable to maintain sufficient gas tightness. The upper limit of the maximum value of the operating temperature range of the gland packing is not particularly limited, and it may be about 1650° C. or lower from the viewpoint of substantial heat resistance and the like.

The main component of the gland packing is preferably expanded graphite. A gland packing composed mainly of expanded graphite has high pressure resistance and high durability and also is an excellent elastic material. Therefore, the hydrogen gas separator fixing structure of the present embodiment, using such a gland packing can secure sufficient mechanical strength between the gas separator and the metal flange and can be used even under high-temperature and high-pressure conditions.

In addition to the expanded graphite, asbestos fibers, metal fibers, etc. can be mentioned as materials of packing which have such a heat resistance that the maximum value of the operating temperature range is 300 or higher, but the asbestos fibers are not preferred because they may adversely affect the human bodies (causing troubles in health) and the metal fibers are not preferred because they may mar the surface of gas separation membrane to which the packing is compression-fixed. Therefore, these problems can be solved by using expanded graphite as the main component of the gland packing.

The hydrogen gas separator fixing structure 30 of the present embodiment does not employ glass bonding, brazing or the like; therefore, it hardly gives rise to, for example, the breakage of gas separator caused by the difference in thermal expansion coefficient and can secure sufficient gas tightness even when there is a temperature rise in actual use of gas separator. Further, the hydrogen gas separator fixing structure 30 of the present embodiment shows excellent durability to the load of heat cycle. Moreover, there is no need to carry out increase of clamping of packing presser even at high temperatures, and troubles of maintenance and examination can be diminished.

The ring-shaped metal member 1 shown in FIG. 1 is constituted by a combination of ring-shaped packing presser 2, ring-shaped stopper 3 and ring-shaped metal flange 4. The ring-shaped metal flange 4 is a member having a through hole 21 therein. A separated gas separated by passing through the gas separation membrane 8 can be taken outside via the through-hole 21. The cap-like metal member 11 also shown in FIG. 1 is constituted by a combination of ring-shaped packing presser 12, ring-shaped stopper 13 and cap-like metal flange 14. The cap-like metal flange 14 has no through hole therein and seals one open end of the gas separator 7. Thus, the metal members may be constituted so that the through hole 21 is formed only in the metal member provided at the open end of gas separator 7, through which the separated gas is taken out.

The ring-shaped metal member 1 is provided so that at least part thereof is in contact with the bonding layer 5, and is a member which can be press-fix the packing 6. The ring-shaped packing presser 2 is a member which can impart a tightening pressure to the packing 6 in the axial direction of the tubular support 9. The ring-shaped stopper 3 is a member which can suppress the movement of the packing 6 to the axial direction, which movement is invited by the impartment of tightening pressure to the packing 6. The packing 6 whose movement has been suppressed by the ring-shaped stopper 3, causes slight deformation actually and is tightly adhered with an appropriate pressure in the inward direction of diameter of gas separator 7, that is, in the direction normal to the surface of gas separation membrane 8, making more reliable the gas tightness between the gas separator 7 and the ring-shaped metal member 1.

In order to give a tightening pressure to the packing 6 and maintain the pressure, a thread groove 20 is preferably formed at the portion where the ring-shaped packing presser 2 and the ring-shaped stopper 3 come in contact with each other. Also, at the outer peripheries of the ring-shaped packing presser 2 and the ring-shaped stopper 3, there are preferably formed chamfers (not shown) for easy thrusting using a wrench or the like.

The thermal expansion coefficients in use temperature ranges, of the metal members (the ring-shaped metal member 1, the ring-shaped packing pressers 2 and 12, the ring-shaped stoppers 3 and 13, the ring-shaped metal flange 4, the cap-like metal member 11, the cap-like metal flange 14, etc.) are preferably $11 \times 10^{-6}/°C$. or less, more preferably $10 \times 10^{-6}/°C$. or less, particularly preferably $9 \times 10^{-6}/°C$. or less. When the tubular support 9 is made of a porous ceramic, the thermal expansion coefficient of the tubular support 9 is $11 \times 10^{-6}/°C$. or less. The reason is that the thermal expansion coefficients of the tubular support 9 and the metal members are preferred to be close from the viewpoints of, for example, control of fluctuation in stress of packing 6 and the prevention of breakage of tubular support 9. Therefore, by allowing the metal members to have thermal expansion coefficients of $11 \times 10^{-6}/°C$. or less, leakage of the gas to be separated or breakage of tubular support 9 under high temperature conditions can be inhibited.

There is no particular restriction as to the lower limit of the thermal expansion coefficients of metal members. In view of, for example, the availability of the material for metal member, metal members whose lower limit is about $0.5 \times 10^{-6}/°C$. can be used with no problem. As specific examples of the metal materials constituting the metal members having thermal expansion coefficients of $11 \times 10^{-6}/°C$. or less, there can be mentioned PERMALLOY (nickel-iron magnetic alloy), KOVAR (nickel-cobalt ferrous alloy), INVAR (nickel-steel alloy), SUPER INVAR (iron-nickel-cobalt magnetic alloy), molybdenum, tungsten and iron-nickel alloys, etc., and PERMALLOY is especially preferred.

Figure 2:
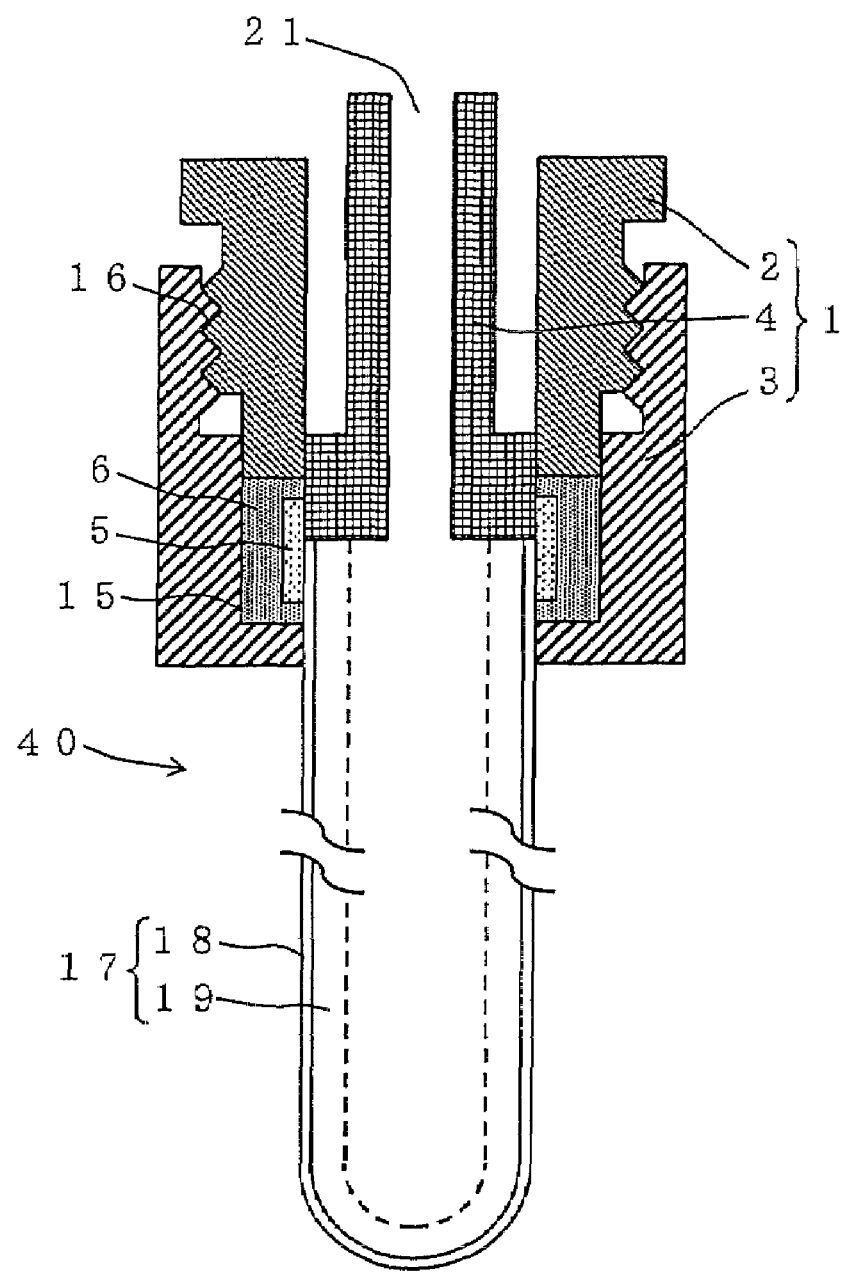
FIG. 2 is a sectional view schematically showing other embodiment of the hydrogen gas separator fixing structure of the present invention.

FIG. 2 is a sectional view schematically showing other embodiment of the hydrogen gas separator fixing structure of the present invention. In the hydrogen gas separator fixing structure 40 shown in FIG. 2, the gas separator 17 comprises a bottomed tubular support 19 and a gas separation membrane 18 formed on the surface of the bottomed tubular support 19. Thus, the gas separator 17 shown in FIG. 2 has only one open end. Therefore, in the hydrogen gas separator fixing structure 40 of the present embodiment, the bonding layer 5, the packing 6 and the ring-shaped metal member 1 are provided only at one open end of the gas separator 17.

Next, description is made on an embodiment of the gas separating device of the present invention. The gas separating device of the present embodiment comprises a pressure vessel and the above-mentioned hydrogen gas separator fixing structure fixed to the inner surface of the pressure vessel.

Description is made on a gas separating device incorporating a hydrogen gas separator fixing structure of the embodiment of FIG. 1. Part of the ring-shaped metal member 1, specifically explaining, the ring-shaped metal flange 4 is bonded by an appropriate bonding method (e.g. welding) and fixed to the inner surface of a pressure vessel (not shown) which is a constituent element of the gas separating device. One open end of the gas separator 7 is gas-tightly sealed by the cap-like metal member 11 via the bonding layer 5 and the packing 6; therefore, the separated gas component which has permeated the gas separator 7, flows toward the open end to which the ring-shaped metal member 1 is fixed, and is taken outside the pressure vessel through the through hole 21. The other gas component in a gas to be treated does not permeate the gas separator 7 and is discharged from an outlet (not shown) of the pressure vessel.

In the gas separating device of the present embodiment, only one end of the hydrogen gas separator fixing structure 30 is fixed to the inner surface of the pressure vessel and other end need not be fixed to the pressure vessel. Therefore, there hardly occur the breakage of the gas separator 7 due to the expansion and shrinkage caused by the load of heat cycle, making possible the long-term use of the gas separating device.

EXAMPLES

The present invention is described specifically below by way of Examples. However, the present invention is in no way restricted to these Examples.

Example 1

There was prepared an aluminum-made tubular support of 10.5 mm in outer diameter, 7.5 mm in inner diameter and 100 mm in length, whose pore diameter at the outer surface was 0.1 μm. On the outer surface of the tubular support was formed a hydrogen-separation membrane (a gas separation membrane) of about 2 μm in thickness, made of Pd—Ag alloy, whereby was produced a gas separator 7 such as shown in FIG. 1. At one open end of the gas separator 7 was provided an ring-shaped metal flange, and a silver (Ag) foil (melting point: 960° C.) was wound, in a given thickness, round the surface of the connection portion between the ring-shaped metal flange 4 and the gas separation membrane 8 so as to be in close contact with the portion and was fixed temporarily. Meanwhile, a packing (foil-shaped packing made of expanded graphite) 6 was accommodated in a stuffing box 15 of an ring-shaped stopper 3 and an ring-shaped packing presser 2 was screwed lightly, whereby the packing 6 was fixed temporarily and an ring-shaped metal member 1 was produced.

Into the ring-shaped metal member 1 was inserted the gas separator 7 to which the silver (Ag) foil had been fixed temporarily. In this case, attention was paid so that there was no movement of the position of the silver (Ag) foil and the packing 6 was positioned so as to cover the whole surface of the silver (Ag) foil. The ring-shaped packing presser 2 was tightened using a torque wrench so that the tightening pressure in axial direction of the gas separator 7 became 30 MPa and the tightening pressure in inward direction of diameter (direction normal to the membrane surface of the gas separator 7) became 20 MPa, whereby individual members were fixed. A heat treatment was applied at 650° C. for 2 hours in an Ar atmosphere to form a bonding layer 5 of 20 μm in thickness and the bonding layer was connected, by mutual diffusion, to the gas separation membrane 8 and the ring-shaped metal flange 4, to produce a hydrogen gas separator fixing structure 30 of Example 1 having a construction such as shown in FIG. 1. Incidentally, the metals parts used were each 45 PERMALLOY (nickel-iron magnetic alloy).

Examples 2 to 10 and Comparative Examples 1 to 6

Hydrogen gas separator fixing structures 30 of Examples 2 to 10 and Comparative Examples 1 to 6 were produced in the same manner as in Example 1 except that the kinds of the metal foils (bonding layer) used, the thicknesses of the bonding layers formed and the heat treatment temperatures employed were as shown in Table 1. Incidentally, the melting point of BAg-8 is 780° C.

[Leakage Amount of He Gas]

Each of the hydrogen gas separator fixing structures 30 produced was placed in a SUS-made vessel and the ring-shaped metal flange 4 was fitted to the wall plate of the vessel so that the ring-shaped metal flange 4 communicated to the outside of the vessel. He gas was introduced into the SUS-made vessel (outside the hydrogen gas separator fixing structure) at a pressure of 0.9 MPa, and there was measured the amount of He gas leaking from inside the ring-shaped metal flange 4, i.e. the leakage amount (ml/min) of He gas. The measurement results are shown in Table 1. Also, a heat cycle of heating from room temperature to 500° C. was conducted 100 times (100 cycles) and there was measured the leakage amount (ml/min) of He gas after 100 cycles. The measurement results are shown in Table 1.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Bonding layer | Kind | Ag | Ag | Ag | Ag | Ag | BAg-8 | BAg-8 | BAg-8 | BAg-8 | BAg-8 |
| | Thickness(μm) | 20 | 50 | 200 | 200 | 400 | 20 | 50 | 200 | 200 | 400 |
| Heat treatment temperature (°) | | 650 | 700 | 700 | 800 | 800 | 600 | 650 | 650 | 700 | 700 |
| Leakage amount of He gas (ml/min) | Before heat cycle | 0.02 | 0.01 | 0 | 0 | 0 | 0.03 | 0.02 | 0.01 | 0.01 | 0.01 |
| | After heat cycle | 0.03 | 0.01 | 0.01 | 0 | 0 | 0.05 | 0.03 | 0.01 | 0.02 | 0.01 |

| | | Comparative Examples | | | | | |
|---|---|---|---|---|---|---|---|
| | | 1 | 2 | 3 | 4 | 5 | 6 |
| Bonding layer | Kind | Ag | Ag | Ag | BAg-8 | BAg-8 | BAg-8 |
| | Thickness(μm) | 10 | 50 | 500 | 10 | 50 | 500 |
| Heat treatment temperature (°) | | 650 | 960 | 800 | 650 | 780 | 700 |
| Leakage amount of He gas (ml/min) | Before heat cycle | 0.05 | 1.02 | 0.01 | 0.04 | 2.34 | 0.02 |
| | After heat cycle | 1.3 | 2.3 | 1.5 | 0.85 | 4.35 | 3.87 |

As is clear from Table 1, the hydrogen gas separator fixing structures of Examples 1 to 10, as compared with the hydrogen gas separator fixing structures of Comparative Examples 1 to 6, are small in leakage amount of He gas and also secure sufficient gas tightness even after repetition of heat cycles.

INDUSTRIAL APPLICABILITY

The hydrogen gas separator fixing structure of the present invention can be used suitably in, for example, hydrogen purifier for fuel cell and apparatus for hydrogen production by steam reforming using hydrocarbons as a raw material.

What is claimed is:

1. A hydrogen gas separator fixing structure comprising:
   a gas separator comprising a tubular support and a gas separation membrane provided on at least one surface of the tubular support, which membrane contains a first metal capable of separating hydrogen gas from a hydrogen-containing gas,
   a metal flange connected to at least one open end of the gas separator,
   a bonding layer of 20 to 400 μm in thickness containing a second metal, provided at the portion at which the gas separator and the metal flange are connected to each other and on the surface of the gas separation membrane side of said portion,
   a packing provided on the bonding layer, and
   a metal member capable of fixing the packing by pressing, provided so that at least part thereof is in contact with the bonding layer,
   wherein the bonding layer is provided on said surface of the gas separation membrane side of said portion by a heat treatment conducted at a temperature lower than the melting point of the second metal.

2. A hydrogen gas separator fixing structure according to claim 1, wherein the first metal is composed mainly of palladium, palladium alloy, and palladium and silver or copper.

3. A hydrogen gas separator fixing structure according to claim 1, wherein the second metal is at least one member selected from the group consisting of gold, silver, platinum, palladium, nickel and copper.

4. A hydrogen gas separator fixing structure according to claim 1, wherein the tubular support is composed of a porous ceramic, a metal, carbon or a mixture thereof.

5. A hydrogen gas separator fixing structure according to claim 1, wherein the metal flange is composed of stainless steel, nickel-chromium based alloy, nickel-cobalt ferrous alloy or a nickel alloy.

6. A hydrogen gas separator fixing structure according to claim 1, wherein the bonding layer is provided on said surface of the gas separation membrane side of said portion by a heat treatment conducted at a temperature lower by at least 50° C. than the melting point of the second metal.

7. A hydrogen gas separating device comprising:
   a pressure vessel, and
   a hydrogen gas separator fixing structure set forth in claim 1, fixed at the inner surface of the pressure vessel.

* * * * *